Firth & Ingham,
Blacking Pipe Molds.

No. 1,463. Reissued Apr. 28, 1863.

Witnesses
Lorenzo Burr
Enoch G. Paul

Inventors
John Firth
John Ingham

N. PETERS, PHOTO-LITHOGRAPHER, WASHINGTON, D. C.

UNITED STATES PATENT OFFICE.

JOHN FIRTH AND JOHN INGHAM, OF PHILLIPSBURG, NEW JERSEY.

IMPROVEMENT IN PIPE-MOLDING.

Specification forming part of Letters Patent No. 26,426, dated December 20, 1859; Reissue No. 1,463, dated April 28, 1863.

*To all whom it may concern:*

Be it known that we, JOHN FIRTH and JOHN INGHAM, both of Phillipsburg, in the county of Warren and State of New Jersey, did obtain Letters Patent of the United States, bearing date the 20th day of December, A. D. 1859, for an Improvement in Pipe-Molding, which Letters Patent we now deem inoperative and invalid by reason of a defective specification; and we do hereby declare the following to be a full, clear, and exact description of the same, reference being had to the accompanying drawings, and to the letters of reference marked thereon.

Our invention relates to an improvement in that portion of the process of forming dry-sand molds for the manufacture of cast-iron pipes known in the trade as "blackwashing;" and our improvement consists in blackwashing pipe-molds by causing a stream or volume of blackwash to flow down the interior of the mold, said stream being controlled in the manner described hereinafter, thereby avoiding the tedious manipulation and the care required in practicing the usual process of blackwashing pipe-molds.

In order to enable others skilled in the art to practice our invention, we will now proceed to describe the manner of carrying it into effect.

Figure 1:
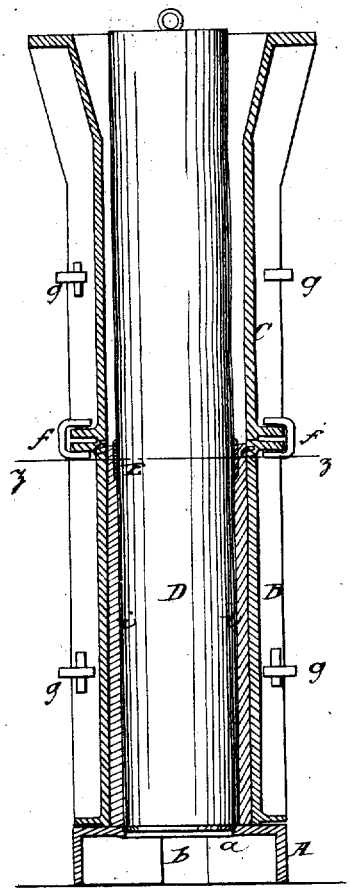
Figure 2:
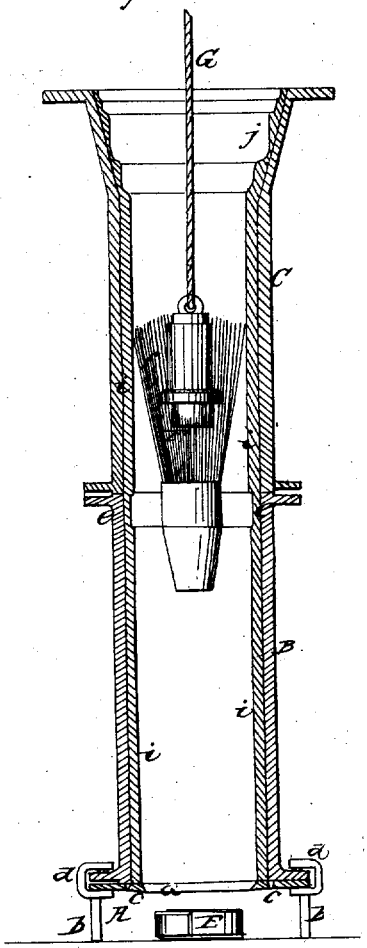
Figure 3:
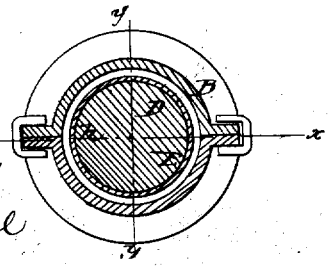

On reference to the accompanying drawings, which form a part of this specification, Figures 1 and 2 are vertical sections of pipe-molds, illustrating the manner of forming the same and our improved mode of blackwashing. Fig. 3 is a sectional plan on the line *z z*, Fig. 1.

Similar letters refer to similar parts throughout the several views.

A represents what we call a "bottom plate," which consists of an inverted shell of cast-iron, having an opening, *a*, of circular form in its upper surface, and two openings, *b b*, of suitable form and dimensions at the opposite sides. (See Fig. 2.)

B represents the lower portion of a flask resting on and fitted to the bottom plate, A, and adjusted properly thereon by guide-pins *c c*, which, projecting from the lower end of the flask, fit snugly in holes in the upper surface of the bottom plate. The flask is secured to the bottom plate by clamps *d d*, and the upper portion, C, of the flask is secured to the lower portion by clamps *f*. The flasks may be thus composed of any suitable number of parts or sections, as circumstances may require, each cylindrical part being composed of two semi-cylindrical pieces clamped together as seen in Fig. 3.

D is the body-pattern, which is of cylindrical form, or of a form corresponding as regards diameter with that of the pipes to be cast. On this body-pattern is placed a flexible ring, E, which is cut or divided as shown at *h*, and beveled at its ends. This ring, when detached from the body-pattern, will, on account of its elasticity, coil up or contract, forming a ring considerably smaller in diameter than the body-pattern; but when adjusted on said pattern the ends of the ring will just be in contact, as shown in Fig. 3.

The mold is formed as follows: The lower portion, B, of the flask is secured to the bottom plate, A, and the body-pattern D is lowered into the flask, its lower beveled end fitting snugly to the beveled edge of the opening *a* in the bottom plate, which serves as a guide for the central adjustment of the pattern. Prepared sand *i* is then rammed into the space intervening between the flask and the body-pattern D and round the ring E, which had previously been adjusted to the pattern in the position shown in Fig. 1. The upper portion, C, of the flask is then secured to the lower portion, and rammed with the prepared sand, a suitable pattern being introduced to form the socket portion J of the mold, as shown in Fig. 2. The body-pattern D is then raised and withdrawn from the flask, in doing which the ring E is left behind embedded in the sand until the pattern is entirely withdrawn, when the ring, on account of its contractile powers, will drop to the bottom of the mold and through the opening *a* of the bottom-plate, having served the purpose of forming in the mold a recess corresponding to the belt or band to be cast on the pipe. The mold having been thus formed, the process to which it has next to be submitted is termed "blackwashing"—that is, covering the interior of the mold with a composition applied in a fluid state. As this process forms the special feature of our invention, it will be well to explain here the usual manner of blackwashing pipe-molds.

Prior to our invention it has been the practice to separate molds for casting pipes of twelve inches in diameter and less into two or more sections prior to blackwashing—as, for instance, the mold illustrated in the drawing would be separated by removing the upper portion, C, of the flask with its sand from the lower portion, B, the two portions being separately submitted to the blackwashing process and afterward connected together again. In molds for pipes of twelve inches in diameter and under, this separation was necessary, in order to apply the blackwash in the usual manner, which is as follows: The molder takes a hempen swab, so small that it will swing freely round in the mold, yet so large that when fully saturated with blackwash it will contain enough to coat the whole interior of the section of the mold, the said section being generally about three feet long. Holding the tip end of the swab in his hand, the molder allows the lower end to enter the section of the mold and imparts to it a rapid rotary motion; then, while the swab continues its rotary motion, the molder lowers it into the mold, the interior of which is thus coated with blackwash. The swab is then withdrawn, and the other sections of the mold are submitted to a like operation, after which the several sections are placed in an oven, and when dry are taken to the casting-pit and there connected together by clamping the joints, so as to form a mold of the desired length.

It will be readily seen by those familiar with the art of molding that this, the usual mode of blackwashing pipe-molds, involves the necessity of tedious manipulation and the exercise of no little skill and caution on the part of the molder. Valuable time is consumed in disconnecting the several sections of the mold from and reattaching them to each other. The flasks at the points where the different sections meet must be provided with guide-pins and suitable pin-holes at the expense of accurate workmanship for forming perfect joints. An accurate junction of the sand portion of one section with that of the other is imperative, and necessitates the making of proper sand joints, in order that the exterior of the pipe when cast may present a smooth uninterrupted surface, ability as well as the consumption of considerable time being required in accomplishing these junctions. Above all it is necessary that the several sections of the mold should be in that perfect line with each other which can only be attained by careful clamping and repeated tests by suitable straight-edges.

Our invention has been especially devised to overcome the difficulties attending the usual process of blackwashing, and to facilitate generally the manufacture of cast-iron pipes, the main end attained by our invention being that of dispensing with the necessity of separating the mold into sections for the purpose of blackwashing.

It may be here remarked that although the flask is illustrated in the drawings as being composed of an upper section, C, and lower section, B, connected together by clamps, each section being composed of two pieces connected together longitudinally, our invention enables us to make the flask throughout its entire length of two pieces only, connected together longitudinally.

In order to practice our improved mode of backwashing, the mold, prepared as described above, and of the entire length of the pipe, is placed in a suitable pit, and the instrument F or its equivalent is brought into play. This instrument in the present instance consists of a block of wood or other suitable material, to which such a mass of bristles, *m*, is secured as to form a circular brush, the diameter of the upper end of which should be somewhat larger than that of the interior of the mold. By means of a cord, chain, or rod, G, the brush is in the first instance lowered so far down into the mold that the space between the top of the latter and the brush will contain sufficient of the fluid blackwash to coat the whole interior of the mold, the brush preventing any but an inconsiderable quantity of the thick fluid from escaping to the space below. The blackwash is but momentarily held in suspension within the mold by the brush, which, as soon as the fluid has been poured into the top of the mold, is lowered through the same, and when it has passed down below the mold the cord is dropped and both brush and cord removed for use in performing a similar operation in another mold. In thus causing the blackwash to flow through the interior of the mold a sufficient quantity will adhere to the surface to give it a proper coating. If a rod be used in place of a cord for lowering the brush, it should be so connected to the latter that when the brush has accomplished its duty and has arrived at a position beneath the mold, it may be readily detached from the rod and removed, while the latter is withdrawn by elevating it through the mold. A simple disk of nearly the same diameter as the mold will temporarily sustain the supply of blackwash and cause the same to flow down the sides of the mold by holding the said disk within the mold near the top of the same, although we prefer the brush for the reason that while it serves to retard the flow of the blackwash it enables the molder to regulate the velocity of the stream. The brush, moreover, passes through the mold freely and without abrading or injuring the packed sand. It should be understood, however, that while we prefer the brush as the regulating and sustaining instrument, the coating of the mold is accomplished by causing a stream of blackwash to flow through the mold. It will now be seen that by this simple process of blackwashing the objections alluded to above are obviated; that molds for pipes of the usual length, or even twelve feet in length, can be blackwashed without taking them apart; that accurate and expensive cross-joints and steadying-pins may be dispensed with; that the labor and time consumed in making said joints, separating the flask into sections, blackwashing and drying these sections separately, connecting them together again, and straightening the whole are obviated, as the mold blackwashed by our improved process is taken in a mass to the drying-oven and thence to the casting-pit; in short, that our invention tends in an eminent degree to facilitate the manufacture of cast-iron pipes.

We claim as our invention—

Blackwashing pipe-molds by causing a stream or volume of the wash to flow through the interior of the mold, the said stream being controlled in the manner described.

In testimony whereof we have signed our names to this specification before two subscribing witnesses.

JOHN FIRTH.
JOHN INGHAM.

Witnesses:
Z. D. SNYDER,
WILLIAM DAVIS.